United States Patent
Kato et al.

[11] 3,940,202
[45] Feb. 24, 1976

[54] LIGHT BEAM DEFLECTION SYSTEM

[75] Inventors: Makoto Kato; Yoshihiro Okino, both of Kyoto, Japan

[73] Assignee: Matsushita Electric Industrial Co., Ltd., Osaka, Japan

[22] Filed: Aug. 20, 1974

[21] Appl. No.: 498,934

Related U.S. Application Data

[63] Continuation of Ser. No. 319,674, Dec. 29, 1972, abandoned.

[30] Foreign Application Priority Data
Dec. 31, 1971  Japan.................................. 47-2483

[52] U.S. Cl..................... 350/3.5; 350/7; 350/162 R
[51] Int. Cl.². ........................................ G02B 5/32
[58] Field of Search.... 350/6, 7, 3.5, 162 R, 162 ZP

[56] References Cited
UNITED STATES PATENTS

| | | | |
|---|---|---|---|
| 3,619,033 | 11/1971 | McMahon....................... | 350/162 R |
| 3,703,724 | 11/1972 | Thomas.................................. | 350/7 |
| 3,721,487 | 3/1973 | Pieuchard et al.................... | 350/3.5 |
| 3,773,401 | 11/1973 | Douklias et al................. | 350/162 R |

OTHER PUBLICATIONS

Cindrich, *Applied Optics*, Vol. 6, No. 9, Sept. 1967, pp. 1531–1534.

*Primary Examiner*—Ronald J. Stern
*Attorney, Agent, or Firm*—Stevens, Davis, Miller & Mosher

[57] ABSTRACT

A light beam deflection system for producing diffracted light having a holographic light beam deflection disc bearing a record of unidimensional fringe patterns along the radial axis on a time division basis over a circumferential portion of the disc, and having means for focusing coherent light beams on the circumferential portion of the light beam deflection disc while rotating the disc.

2 Claims, 8 Drawing Figures

LIGHT BEAM DEFLECTION SYSTEM

This is a continuation, of application Ser. No. 319,674, filed Dec. 29, 1972, now abandoned.

This invention relates to a light beam deflection system using a coherent light beam such as a laser light beam for unidimensional scanning with a light beam spot, thereby enabling light beam deflection control inexpensively and with high efficiency.

The light beam deflection system according to the invention may be effectively employed for television display and incorporated in facsimile systems.

The presently available methods of light beam deflection include mechanical ones, those which utilize certain effects of acoustic optics and those which utilize electro-optical effects. Any of these methods has both merits and demerits, and none of them is regarded as the most promising method. Generally, large deflection angle, high deflection speed, high resolution and stability are requisite factors for superior deflection performance. However, none of the afore-mentioned methods can meet by itself all of these factors. For example, with galvanometer deflection systems, which are examples of the mechanical method, large deflection angle can be obtained with simple construction on the merit side, but the deflection speed is low on the demerit side. Ultrasonic wave deflection systems, on the other hand, are quite opposite in performance. In addition to the above methods, there has recently been proposed a method using holographic techniques where the phenomenon of diffraction of light and mechanical rotational motion are combined. However, also in this method a problem is still involved in which uniform resolution can not be attained.

An object of the invention is to provide an improved light beam deflection system.

The present invention in particular provides improvements over the prior art system of D. H. McMahon et al. under the condition that its application is limited only to the uni-dimensional holographic scanning, and it is intended to provide a light beam deflection system, which has superior performance and ensures uniform resolution during holographic scanning.

According to the invention, there is provided a light beam deflection system using a holographic light beam deflective disc bearing a record of uni-dimensional fringe patterns arranged on a time division basis over a circumferential portion of said disc, said system including means for focusing coherent light beams on said circumferential portion of said light beam deflection disc while said disc is being rotated, to thereby produce diffracted light used as a scanning light beam.

The invention will become more apparent from the following detailed description of a preferred embodiment thereof taken in conjunction with the accompanying drawings, in which:

FIG. 1 shows an optical system for lattice pattern (hologram) recording used in such a light beam deflection method, and FIG. 2 shows an arrangement for hologram recording including other mechanisms than the above optical system.

Figure 1:
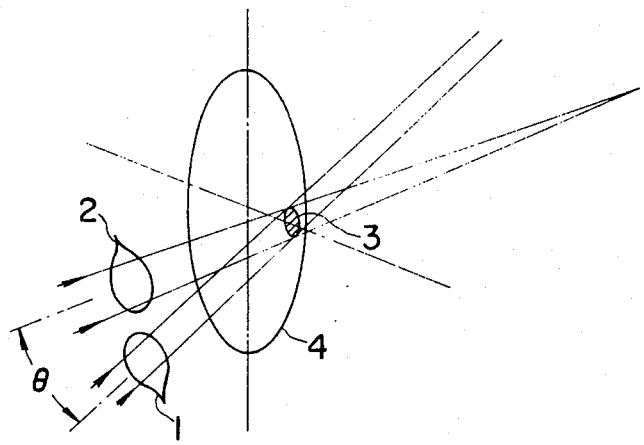
FIG. 1 shows an optical system for recording Fresnel zone plates resulting from the interference between two coherent light beams.
Figure 2:
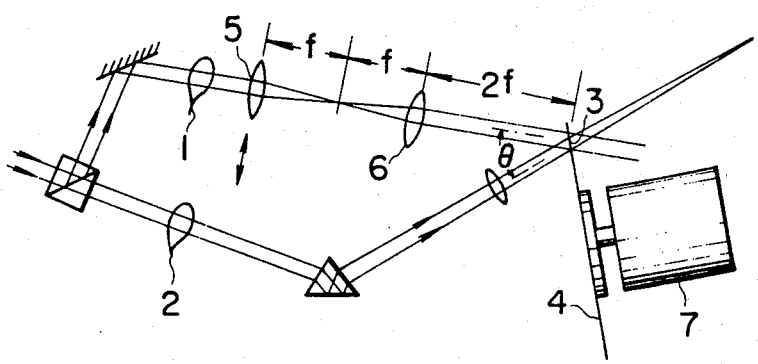
FIG. 2 is a schematic representation of an arrangement for successively recording similar interference fringe patterns on a rotating disc.

Referring to FIG. 1, an interference pattern resulting from a signal wave 1 and a reference wave 2 coherent to each other is recorded as a Fresnel zone plate 3 on a disc 4. In the arrangement of FIG. 2 a number of similar interference patterns are successively recorded along the circumferential portion of the disc by progressively varying the angle $\theta$ between the signal wave 1 and the reference wave 2. The adjustment of the angle $\theta$ is done by moving a lens 5 as shown in FIG. 2. Here a recording plane on which the Fresnel zone plate 3 is to be recorded is set in the conjugate plane of the lens aperture 5 with respect to the lens 6. Character $f$ denotes the distance in such an arrangement. Thus, the Fresnel zone plate 3 can be recorded on the circumferential portion of the disc 4, which is rotated by a timing motor 7. Then, the disc 4 is illuminated with a colliminated coherent light beam while it is rotated to produce a diffracted light which scans successively on its focussed plane. This method is disclosed in detail in an article entitled "Light Beam Deflection Holographic Scanning Techniques" by D. H. McMahon et al. Applied Optics, 1969, vol. 8, pages 399 to 402.

According to this method, two-dimensional scanning at comparatively high speed and of large deflection angle can be realized in a simple way by merely rotating a single disc. However, this method has a drawback in that the resolution is lowered as the light beam deviates from each Fresnel zone plate during the rotation of the disc.

Figure 3A:
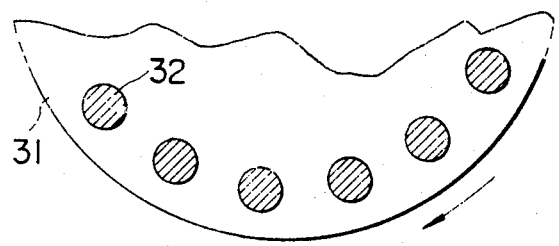
FIGS. 3a, 3b and 3c show production of diffracted light using holographic records obtained with the arrangement of FIG. 2.
Figure 3B:
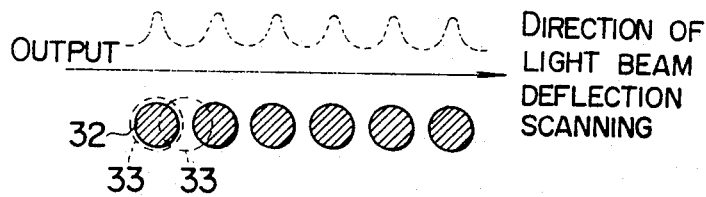
Figure 3C:
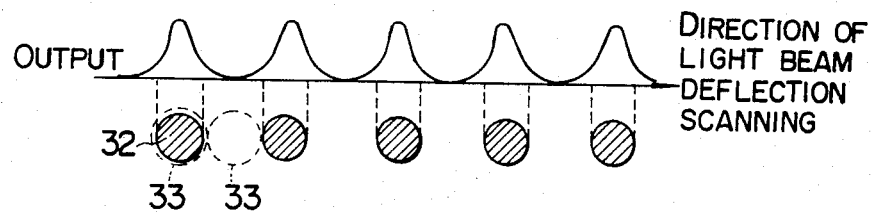

This aspect is illustrated in FIG. 3. FIG. 3a shows a disc 31 carrying Fresnel zone plates 32 for two-dimensional holographic scanning. It is rotated while it is illuminated with a collimated coherent light beam. When the light beam coincides with a Fresnel zone plate, a high output is obtained, as shown in FIG. 3b. However, when the spot of the light beam comes astride the gap between adjacent Fresnel zone plates, not only is the output reduced, but also both adjacent two zone plates are simultaneously illuminated. To avoid simultaneous reproduction of double points, the distance between adjacent record portions may be increased as shown in FIG. 3c, but this would merely lead to an extended time interval between consecutive outputs. In either case of FIG. 3b or FIG. 3c it is impossible to steadily maintain a constant resolution.

Figure 4:
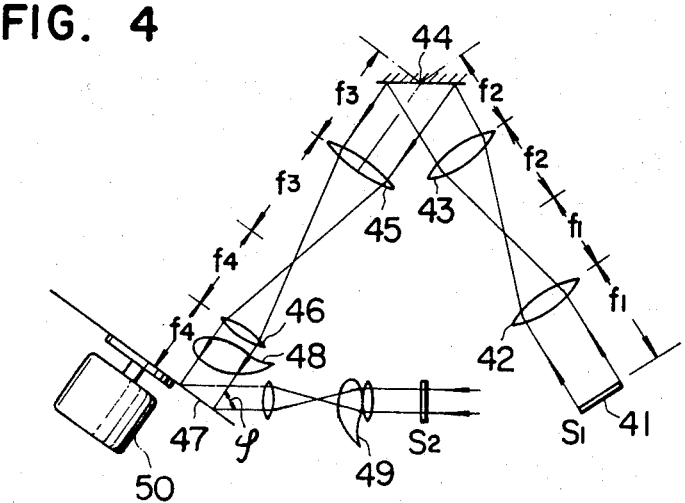
FIG. 4 is a schematic representation of an embodiment of the optical system according to the invention for recording uni-dimensional fringe patterns on a rotating disc in synchronism with a vibrating mirror.

Referring now to FIG. 4, which shows an embodiment of the optical system for recording uni-dimensional laser light interference fringe patterns according to the invention, an image of a slit 41 illuminated with collimated coherent light is focused through lenses 42 and 43 on an oscillating mirror 44, and light reflected therefrom is focused through further lenses 45 and 46 to a recording surface 47. On the recording surface 47 the signal beam 48 falls in superimposition upon a reference beam 49 for recording of the uni-dimensional interference fringe patterns. The mirror 44 is slowly rotated at a constant angular velocity while causing the recording surface to proceed at a certain constant speed in a direction normal to the sheet of the Figure. By so doing, a continuously changing fringe pattern is progressively recorded on the recording surface. The driving of the recording surface is effected by operating a drive motor 50 in synchronism with a drive signal for driving the oscillating mirror 44.

Figure 5:
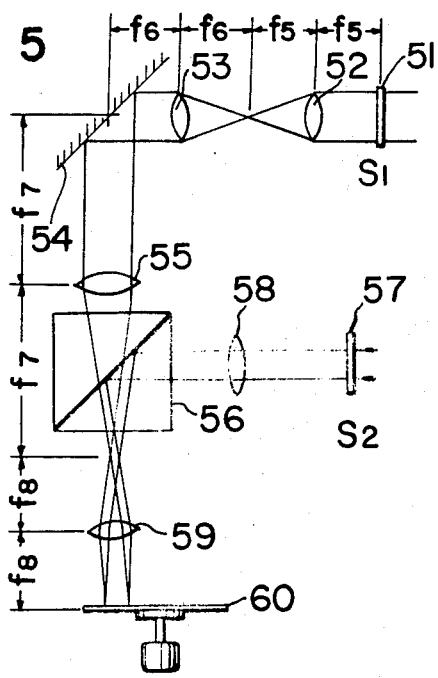
FIG. 5 is a schematic representation of a different embodiment of the optical system according to the invention.

FIG. 5 shows a different embodiment, whose mode of operation may be more easily understood. In FIG. 5, elements 51 to 60 correspond to the respective elements 41 to 50 in FIG. 4.

In place of focusing coherent light beams on a light-sensitive film formed on the recording surface, it is also possible to use electron beams for the formation of the uni-dimensional fringe patterns.

Figure 6:
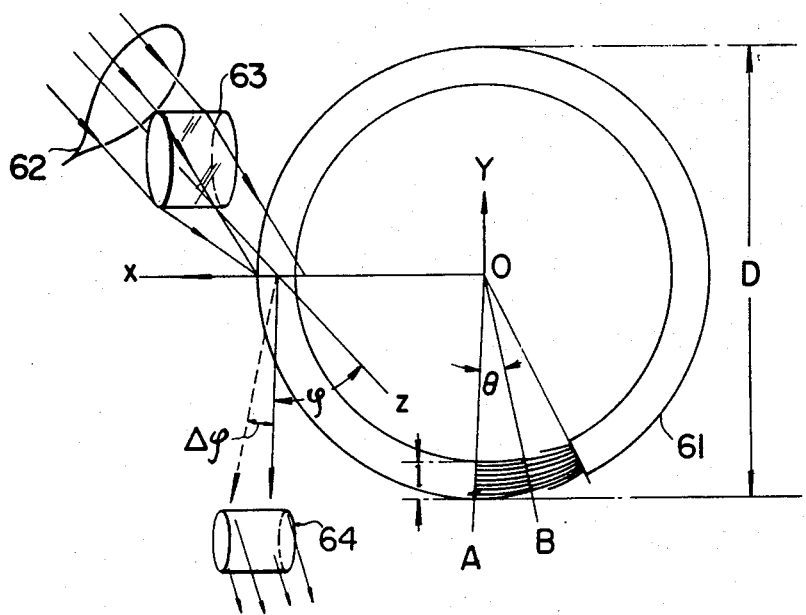
FIG. 6 shows the way of diffracting laser light using uni-dimensional fringe records obtained on a disc in accordance with the invention.

FIG. 6 shows a disc bearing a record of fringe patterns obtained in the above manner. By focusing a collimated coherent light beam 62 through a cylindrical lens 63 on a line labelled $x$ axis passing through the center of the plane of the disc 61 whose normal is coincident with the direction of the beam 62 labelled $z$ axis, the resultant diffraction angle $\phi$ corresponds to the angle between a signal light beam and reference light beam in the uni-dimensional holographic recording optical system of FIG. 4. With the rotation of the disc 61 the fringe constant of the uni-dimensional fringe pattern appearing on the $x$ axis changes. Thus, the change in the incident angle of the signal light beam 48 due to the rotation of the mirror 44 in the system of FIG. 4 is reproduced in the form of a change $\Delta\phi$ in the diffraction angle. In FIG. 6, the diffracted light may be rendered into a parallel light beam by passing it through the cylindrical lens 64, and then it may be changed into a light beam of a required form. That is, the deflection disc 61 bears a record of a plurality of blocks of interference fringe patterns each consisting of a gathering of the uni-dimensional fringe patterns. The pitches along the radial axis in each one of the uni-dimensional fringe patterns is the same and the pitches along the radial axis of the uni-dimensional patterns differ as the patterns differ.

As for example, by dividing the recording surface of the disc 61 into 50 equal sectors such that each sector AOB contains a fringe pattern for one cycle where the fringe constant continuously varies and by rotating the disc 61 at a speed of 18,000 rpm, the speed or frequency of scanning with the diffracted light is $$\frac{18,000}{60} \times 50 \text{ (Hz)} = 15,000 \text{ (Hz)}.$$

By way of example, with $\theta = 360°/50 = 7.2°$, track width $l = 5$ mm, maximum fringe constant $d_{max} = 3.7$ microns, minimum fringe constant $d_{min} = 3$ microns and laser light wavelength $\lambda = 6,328$ A in the system of FIG. 4, a resolution of 500 lines may be obtained. In this case, if the disc diameter if $D = 100$ mm, that is, if the arc of each sector is $\overline{AB} = 6$ mm, it is necessary for the line image along the $x$ axis to have a half width of about $$\frac{6}{500} mm = 12 \text{ microns,}$$

which corresponds to the resolution of the cylindrical lens 63. Also, a line image having a width of about 10 microns is required at the time of recording of the uni-dimensional fringe pattern. Further, although an amplitude type fringe pattern may be used for the deflection scanning, a phase type fringe is preferred from the standpoint of bettering the diffraction efficiency, and in the case of the phase type fringe the disc may be either transparent or of the reflecting type. Furthermore, by dividing the circumference of the disc into 275 equal sections, it is possible to obtain light beam spot scanning for one horizontal television scan line within each sector and for one television field with the whole circumferential portion of the disc.

As has been described in the foregoing, according to the invention by continuously rotating a disc in one direction it is possible to obtain light beam deflection scanning in one-dimensional direction with steady and constant resolution during the scanning. Also, scanning at high density may be obtained. Further, the light beam deflection system according to the invention may be applied to the television display and like field by combining it with an oscillating mirror operating at a low frequency (for instance 60 Hz). Furthermore, the disc bearing a record of fringe patterns may be manufactured inexpensively on a mass production basis by a contact printing method in case of the amplitude fringes, and by a method similar to the record disc duplicating technique using the original disc as a pressure mold in the case of the phase fringe. Moreover, it is also possible to use electron beams for the formation of the uni-dimensional fringe pattern.

What we claim is:

1. A light beam deflection system comprising a light beam deflection disc having a surface divided into a plurality of identical contiguous blocks of interference fringe patterns each occupying a sector of an annulus on the surface of said disc, said sector being defined by first and second radial lines, the fringe pattern within each of said blocks comprising approximately circumferential fringe lines having a given radial spacing along said first radial line and a greater radial spacing along said second radial line, the radial spacing between said circumferential fringe lines along radial lines intermediate said first and second radial lines increasing in the direction from said first radial line to said second radial line, means for rotating said disc, and means for focusing a coherent light beam to a radially extending line on a portion of said disc having an interference fringe pattern block, the width of said line in the circumferential direction being substantially less than the circumferential width of said block, said beam being deflected as said disc is rotated.

2. A light beam deflection system as defined by claim 1 wherein the difference in radial spacing of said circumferential lines along a pair of radial lines within one of said blocks varies substantially as a linear function of the angular displacement of said radial lines.

* * * * *